June 23, 1942.  H. W. LINDSAY  2,287,438
BRAKE MECHANISM
Filed Sept. 29, 1941  2 Sheets-Sheet 1
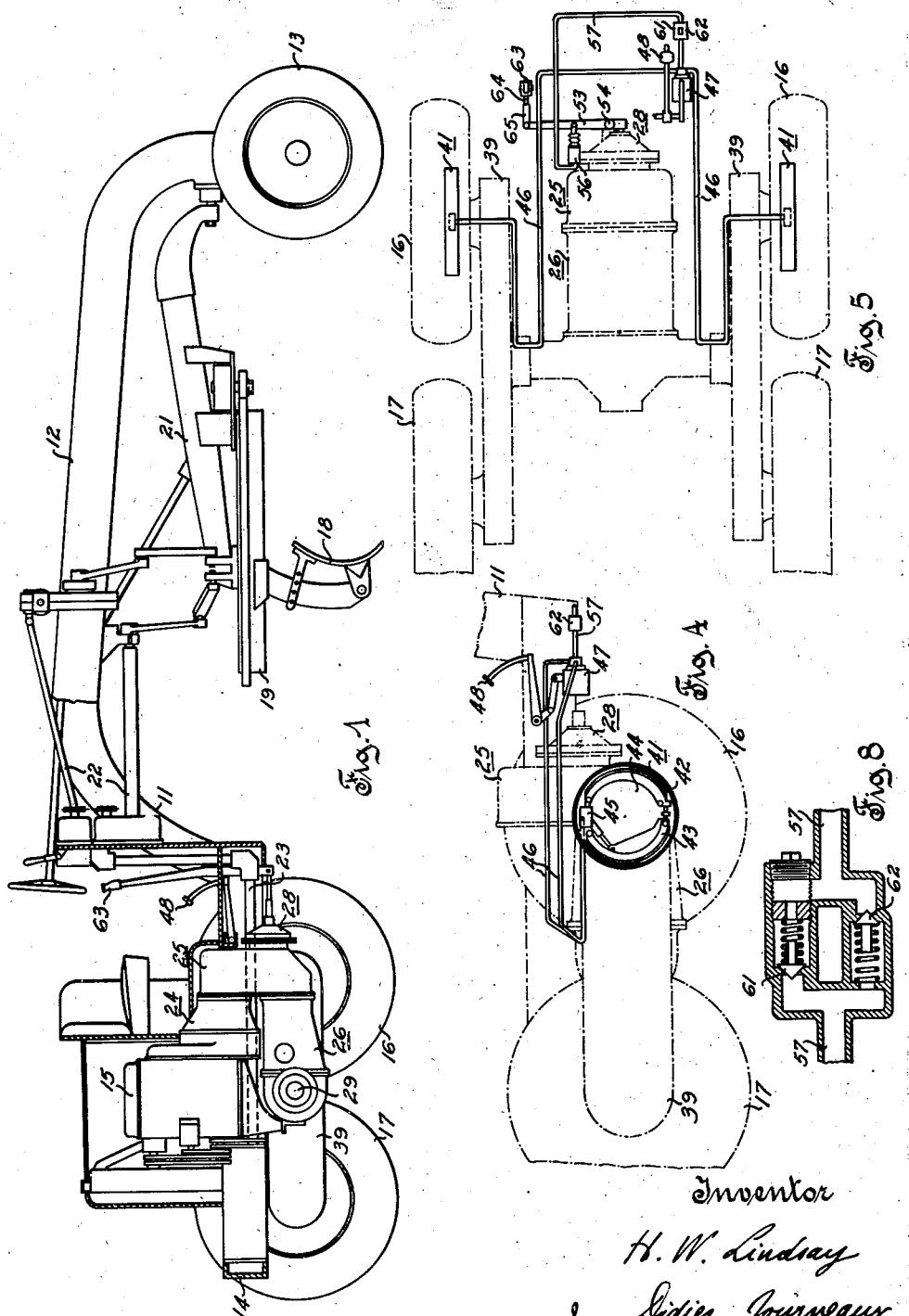
Inventor
H. W. Lindsay
by Didier Journeaux
Attorney June 23, 1942.   H. W. LINDSAY   2,287,438
BRAKE MECHANISM
Filed Sept. 29, 1941   2 Sheets-Sheet 2
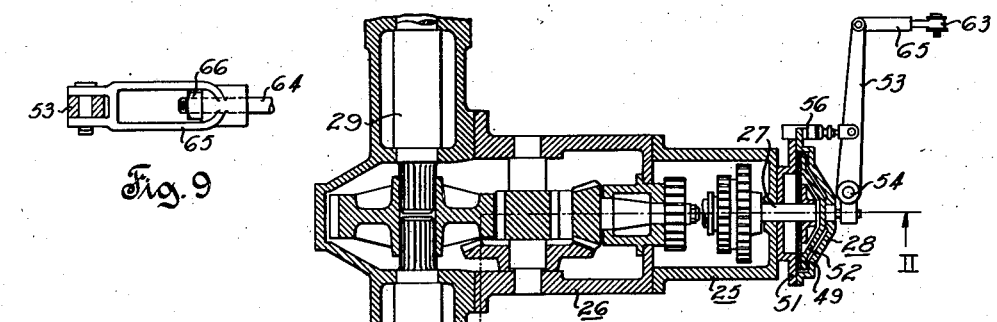
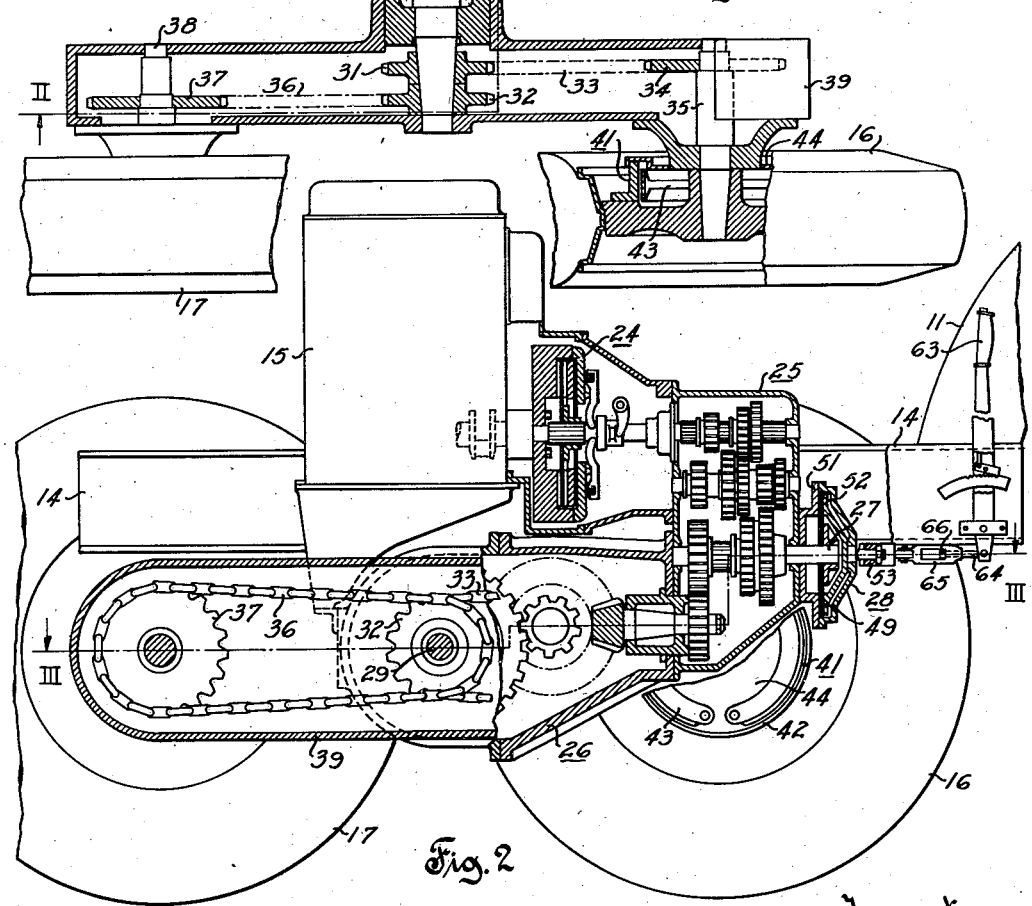
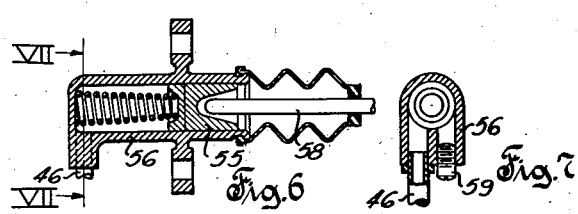
Inventor
H. W. Lindsay
by Didier Journeaux
Attorney Patented June 23, 1942

2,287,438

UNITED STATES PATENT OFFICE 2,287,438

BRAKE MECHANISM

Horace W. Lindsay, La Porte, Ind., assignor to Allis-Chalmers Manufacturing Company, Milwaukee, Wis., a corporation of Delaware Application September 29, 1941, Serial No. 412,800

9 Claims. (Cl. 37—156)

This invention relates in general to improvements in brake mechanisms and more particularly to a braking system for a motor vehicle comprising at least one driving wheel mounted on a member pivotally attached to the vehicle frame, the system being so arranged as to prevent excessive rocking of the pivoted member in response to variable degrees of application of the brakes.

The braking system of motor vehicles generally comprises brakes acting on the driving wheels, which frequently cooperate with brakes acting on idler wheels. The brakes on the driving wheels should be able to prevent the wheels from turning under the action both of the momentum of the vehicle and of the motor torque. This requirement is in prevision of the fact that the motor may be left in gear with the throttle open, either inadvertently or by accident.

Under such conditions, considerable efforts are transmitted through the driving wheels, and if the wheels are mounted on arms which are pivotally attached to the vehicle frame, the arms tend to rock excessively under the action of the braking efforts. This effect is particularly objectionable in vehicles provided with a tandem drive in which the driving wheels are mounted on balance arms, generally called tandem cases, which are pivoted about the driving axle. The tandem cases are generally maintained in position by the sole action of the vehicle weight, and the braking efforts may rock the tandem cases to the point of causing the entire tandem assembly to turn over.

This disadvantage may be obviated by providing the propulsion system of the vehicle with a dual braking system such that, at least when the brakes are locked, the tandem cases are prevented from rocking with respect to the vehicle frame. This result may be obtained by providing a brake acting between the propulsion system and the tandem cases and another suitably dimensioned brake acting between the propulsion system and the main frame of the vehicle.

It is therefore one object of the present invention to provide a braking system for a motor vehicle so arranged as to prevent braking efforts from imparting excessive rocking motion to a driving wheel arm pivotally mounted on the vehicle frame.

Another object of the present invention is to provide a braking system for a motor vehicle comprising a brake tending to cause a wheel arm to rock about one axis and another brake tending to cause the wheel arm to rock about another axis to prevent movement of the wheel arm when the brakes are locked.

Another object of the present invention is to provide a braking system for a motor vehicle whereby the torque of the motor is at least partially removed from the driving wheel and from the driving wheel arm by the action of the brakes.

Another object of the present invention is to provide a braking system for a motor grader of the tandem drive type by means of which the height of the moldboard will remain undisturbed upon severe application of the brakes.

Objects and advantages other than those above set forth will be apparent from a consideration of the following description when read in connection with the accompanying drawings, in which:

Fig. 1 is a view partly in side elevation and partly in section of a road grader comprising a tandem drive provided with a braking system arranged in accordance with the present invention;

Fig. 2 is an enlarged view, partially in cross section, of a portion of the grader illustrated in Fig. 1 showing the propulsion system and the different brakes of the grader;

Fig. 3 is a plan view partially in cross section showing the propulsion system and the different brakes of the grader;

Fig. 4 is a view in elevation of the braking system of the grader;

Fig. 5 is a plan view of the braking system of the grader;

Fig. 6 is a view in longitudinal cross section through the transmission brake actuating cylinder;

Fig. 7 is a view in transverse cross section through the transmission brake actuating cylinder;

Fig. 8 is an enlarged view in cross section of the control valves included in the system illustrated in Fig. 5; and Fig. 9 is an enlarged plan view of the sliding yoke connecting the parking brake lever with the transmission brake of the grader.

Referring more particularly to the drawings by characters of reference, the grader illustrated in Fig. 1 has for its principal component a wheeled frame 11. This frame comprises a forward tubular portion 12 supported on a pair of front idler wheels 13, and a rear box-like portion 14 containing the engine 15 and supported on two pairs of driving wheels 16, 17 mounted in tandem. A moldboard 18 is mounted on the frame through a circle 19 and through a drawbar 21 pivoted at the front end of the frame. The moldboard may be placed in any desired position by means of a plurality of control shafts 22 actuable by engine 15 through a power take-off shaft 23.

As shown more clearly in Fig. 2, the propulsion system for the grader comprises engine 15, wheels 16, 17 and suitable transmission means therebetween. The transmission means comprise a clutch 24, a transmission 25, and a final drive 26. Transmission 25 may be of any suitable known type comprising a plurality of suitable groups of gears splined on a plurality of shafts, including a shaft 27 provided with a brake 28. The bottom shaft of the transmission is geared to the final drive of the transmission which comprises a divided driving axle 29.

The axle is journaled in frame portion 14 and carries two pairs of sprockets 31, 32. Sprockets 31 drive wheels 16 through chains 33 and through spockets 34 mounted on the axles 35 of wheels 16. Sprockets 32 similarly drive wheels 17 through chains 36 and through sprockets 37 mounted on the wheel axles 38. The driving wheels are mounted on balance arms or tandem cases 39 serving as housings for the sprockets and chains. To enable the wheels to follow the contour of the ground, the tandem cases are pivotally mounted on frame 11 through axle 29, which transmits the weight of the rear portion of the grader to the driving wheels through the tandem cases. At least wheels 16 are provided with brakes 41 of any suitable type.

Brakes 41 are preferably of the hydraulically operated internal expanding type shown in detail in Fig. 4 of the drawings. Each wheel brake accordingly comprises a brake drum 42 mounted on one of the wheels and a pair of brake shoes 43 mounted on a backing plate 44. The backing plate is rigidly mounted on the corresponding tandem case and carries a hydraulic actuating cylinder 45. The cylinders are connected through piping 46 with a master cylinder 47 mounted on frame 11 and associated with the usual brake pedal 48. Piping 46 is supported partly on tandem cases 39 and partly on frame 11. It is made at least partially of flexible material and passes from the tandem cases to the frame in close proximity to the driving axle to prevent its being damaged by rocking of the tandem cases relatively to the frame.

Brake 28 is preferably of the disk type comprising a disk 49 slidably splined on shaft 27. Disk 49 is adapted to be clamped between an inner pressure plate 51 rigidly mounted on the transmission housing and a movable outer pressure plate 52. Plate 52 may be urger toward plate 51 by means of a lever 53 fulcrumed on the brake housing through a pin 54. Lever 53 may be actuated by a piston 55 movable in a cylinder 56 connected with master cylinder 47 through piping 57. Piston 55 and lever 53 are connected through a piston rod 58 abutting against a depression of the outer face of the piston without being attached thereto. Cylinder 56 may be provided with the usual bleeder screw 59 to permit removal of any air entrapped within the cylinder.

Piping 57 may comprise an adjustable check valve 61 for connecting cylinder 56 with master cylinder 47 only in response to increase of the braking effort exerted by the wheel brakes beyond a predetermined adjustable value. Valve 61 is bypassed by a return valve 62. Lever 53 is connected with the parking brake lever 63 through a rod 64 engaging a sliding yoke 65 through a nut 66 to permit application of brake 28 by cylinder 56 when lever 63 is in the released position.

The effect of the braking system described herein on the stability of the grader will be more apparent by first considering the effects of separate applications of the wheel brakes and of the transmission brake.

The grader traveling in the forward direction, if only the wheel brakes are applied, all wheels 16 and 17 take part in the braking action because they are interconnected by means of chains 33, 36 and of axle 29. The braking action is the same in principle whether the brakes be slipping or locked, only the magnitude of the braking effort being predetermined by the brake shoe pressure as long as the brakes remain slipping.

The brakes may therefore be assumed to be locked and the tandem system of wheels 16, 17 and tandem cases 39 may then be considered as constituting a single solid body. This body is subjected to two forces. One force is the weight of the tandem system itself and of the portion of the grader supported thereon, which weight tends to maintain all driving wheels applied to the ground. The other force is the force of inertia having its point of action at the driving axle and resulting from the deceleration of the entire grader. The latter force tends to rock the entire tandem system about an axis passing through the points of contact of wheels 16 with the ground. Under unfavorable circumstances, as when wheels 16 are dropped into a ditch, this force may cause the tandem system to turn over completely.

If only the transmission brake is applied, the force of inertia again tends to rock the tandem cases against the stabilizing action of the weight of the vehicle, but the conditions become somewhat different from those considered above. The transmission brake, when locked, holds the driving axle 29 immovable with respect to the vehicle frame, but the wheels remain free to turn with respect to the tandem cases. If sprockets 31, 34 have the same diameter, the sprockets with chains 33 and axle 29 become the mechanical equivalent of an articulated parallelogram linkage connecting the wheels directly with the frame. As the frame remains substantially level when the tandem cases rock, the driving wheels retain substantially their original angular position regardless of any rocking of the tandem cases. Such rocking then must take place about an axis which is that of the axles of wheels 16. If sprockets 31 have a smaller diameter than sprockets 34, as shown in the drawing, the axis of rotation is depressed below the axis of wheels 16 to an extent depending upon the sprocket ratio.

Assuming valves 61, 62 omitted from the braking system, depressing brake pedal 48 causes all three brakes to be applied simultaneously. As long as the braking effort is moderate and the brakes are slipping, the effect of the brakes on the stability of the tandem system is intermediate that of the wheel brakes and that of the transmission brake. When the braking effort is moderate, however, the danger of turning over the tandem system is slight.

If the braking effort is increased to the point of locking all brakes, the grader is abruptly decelerated and the force of inertia acting on the driving axle becomes very large. The danger of turning over the tandem system then increases, but conditions become different from those considered above. The locked wheel brakes prevent the tandem system from rotating about any axis other than the axis passing through the points of contact of wheels 16 with the ground. The locked transmission brake prevents the tandem system from rotating about any other axis than the axis above defined depending on the sprocket ratio. These two restraints completely immobilize the tandem system with respect to the vehicle frame even if the braking effort reaches a sufficient value to cause the wheels to slip on the ground. Any danger of the tandem system turning over is thereby completely removed, and the moldboard remains at its preadjusted height during application of the brakes regardless of the magnitude of the braking efforts.

When the vehicle is traveling backwards, braking tends to cause the tandem system to rock in the reverse direction about wheels 17 instead of wheels 16, but locking of the transmission brake and of the wheel brakes again prevents any rocking of the tandem system. This result is obtained regardless of whether the wheels be running on the ground or on a flexible or articulated track. It is also obtained in vehicles provided with a single pair of driving wheels mounted on wheel arms pivoted on the vehicle frame and held in stable position by means of springs instead of by a second pair of wheels. In this case, rocking of the wheel arms always takes place about the same pair of wheels, but the wheel arms again tend to rotate in a direction depending on the direction of travel of the vehicle. In each case, the desired result may be obtained by providing a brake acting between the propulsion system of the vehicle and the vehicle frame, and another brake acting between the propulsion system and the wheel arms as in the above described embodiment. Either brake may also be used in combination with a brake acting between the wheel arms and the frame. In any case, it is immaterial whether the engine be mounted on the frame or on a separate vehicle.

The transmission brake contributes less than the wheel brakes to the tendency of the tandem system to turn over because it tends to cause the turning over to take place about a higher axis. From that point of view it would be advantageous to apply the major portion of the braking effort to the transmission brake. On the other hand, the transmission brake acts through the final drive, which is thereby subjected to considerable stresses. The braking efforts are therefore preferably applied largely through the wheel brakes, and it has been found advantageous to apply one-third of the braking effort through the transmission brake and the remaining two-thirds through the wheel brakes.

In any event, the brakes should be so dimensioned as to be able to stop the vehicle even if the engine be inadvertently or accidentally left in gear with the throttle fully open. The wheel brakes should therefore preferably be able alone to exert a braking effort greater than the friction of the driving wheels on the ground and the transmission brake alone should preferably be able to exert a braking effort greater than the maximum tractive effort of the engine.

If it is desired to avoid transmitting braking efforts through the final drive except in emergencies, valves 61 and 62 are inserted in piping 57 between cylinder 56 and master cylinder 47. When a moderate pressure is exerted on brake pedal 48, valve 61 remains closed and only the wheel brakes are actuated to exert a moderate braking effort, varying with the pressure applied on the pedal. When the pressure on the pedal is further increased to increase the braking effort beyond a predetermined value, the hydrostatic pressure in master cylinder 47 becomes sufficient to open valve 61, which admits braking fluid into transmission brake cylinder 56 through piping 57. Under these conditions, all brakes are applied and participate in the braking effort. When the brake pedal is released, fluid is returned from cylinder 56 to the master cylinder through valve 62. Valve 62 being lightly spring loaded, the fluid in cylinder 56 remains under a slight pressure sufficient to prevent leakage of air between piston 55 and cylinder 56 into the braking system.

Whenever the transmission brake is applied hydraulically, lever 53 is rocked about pin 54 and moves yoke 65 towards parking brake lever 63. The yoke slides on rod 64 so that the brake may be applied without interference from the parking brake lever. When the vehicle is to be parked, brake lever 63 is pulled towards the rear. The lever pulls rod 64 which engages yoke 65 through nut 66. Lever 53 is again rocked about pin 54 to lock the transmission brake alone. Upon rocking of lever 53, piston rod 58 may be withdrawn freely out of contact with piston 55 so that the transmission brake may be applied without interfering with the wheel brakes or with the hydraulic system.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a vehicle, a main wheeled frame, a rigid member pivotally mounted on said frame, a propulsion system for said vehicle comprising an engine, a driving wheel mounted on said member and transmission means connecting said engine with said driving wheel, and means for decelerating said vehicle comprising a first brake acting on said propulsion system causing said member to tend to rock about a first predetermined axis, a second brake acting on said propulsion system causing said member to tend to rock about a second predetermined axis, and common means for applying said first and second brakes, whereby said member is prevented from rocking when said first and second brakes are locked.

2. In a vehicle, a main wheeled frame, a rigid member pivotally mounted on said frame, a propulsion system for said vehicle comprising an engine, a driving wheel mounted on said member and transmission means connecting said engine with said driving wheel, and means for decelerating said vehicle comprising a first brake connected between said propulsion system and said frame, a second brake connected between said propulsion system and said member, and common means for applying said first and second brakes.

3. In a vehicle, a main wheeled frame, a rigid member pivotally mounted on said frame, a propulsion system for said vehicle comprising an engine, a driving wheel mounted on said member and transmission means connecting said engine with said driving wheel, and means for decelerating said vehicle comprising a first brake connected between said propulsion system and said frame, a second brake connected between said propulsion system and said member, common means for applying said first and second brakes, and means for applying said first brake independently of said second brake and of said common means.

4. In a vehicle, a main wheeled frame, a propulsion system for said vehicle comprising an engine, a driving wheel, and transmission means connecting said engine with said driving wheel and comprising a driving axle mounted on said frame, a rigid member connecting said driving wheel with said frame and pivoted about said driving axle, and means for decelerating said vehicle comprising a first brake connected between said propulsion system and said frame, a second brake connected between said propulsion system and said member, and common means for applying said first and second brakes.

5. In a vehicle, a main wheeled frame, a rigid member pivotally mounted on said frame, a propulsion system for said vehicle comprising an engine, a driving wheel mounted on said member and transmission means connecting said engine with said driving wheel, and means for decelerating said vehicle comprising a first brake connected between said propulsion system and said frame, a second brake connected between said propulsion system and said member, brake applying means connected with said second brake to exert an adjustable braking effort, and means responsive to increase of said braking effort beyond a predetermined value for operatively connecting said brake applying means with said first brake.

6. In a vehicle, a main wheeled frame, a rigid member pivotally mounted on said frame, a propulsion system for said vehicle comprising an engine, a driving wheel mounted on said member and transmission means connecting said engine with said driving wheel, and means for decelerating said vehicle comprising a first brake connected between said propulsion system and said frame and having a maximum braking effort greater than the maximum tractive effort of said engine, a second brake connected between said propulsion system and said member and having a maximum braking effort greater than the friction of said driving wheel on the ground, and common means for applying said first and second brakes to stop said vehicle even when said engine is exerting its maximum effort on said driving wheel.

7. In a vehicle, a wheeled frame, a pair of tandem cases pivotally mounted on said frame, a propulsion system for said vehicle comprising an engine, two pairs of driving wheels mounted in tandem on said cases, and transmission means connecting said engine with said driving wheels, and means for decelerating said vehicle comprising a brake connected between said transmission means and said frame, at least one pair of brakes connected between one of said pairs of driving wheels and said tandem cases, and common means for applying the first and second said brakes.

8. In a vehicle, a main wheeled frame, a pair of tandem cases mounted on said frame, a propulsion system for said vehicle comprising an engine, two pairs of driving wheels mounted in tandem on said cases, and transmission means connecting said engine with said driving wheels, means for decelerating said vehicle comprising a brake connected between said transmission means and said frame, at least one pair of brakes connected between one of said pairs of driving wheels and said tandem cases, a brake pedal, and a hydraulic pressure transmission system connecting said brake pedal with all said brakes for applying all said brakes simultaneously, a parking brake lever, and means comprising a sliding yoke connecting said brake lever with the first said brake, whereby the first said brake may be applied independently by said brake pedal and by said brake lever.

9. In a grader, a wheeled frame, a moldboard mounted on said frame, a pair of tandem cases pivotally mounted on said frame, a propulsion system for said grader comprising an engine, two pairs of driving wheels mounted in tandem on said cases, and transmission means connecting said engine with said driving wheels, and means for decelerating said grader while maintaining said moldboard at a substantially constant height comprising a brake connected between said transmission means and said frame, at least one pair of brakes connected between one of said pairs of driving wheels and said tandem cases, and common means for applying the first and second said brakes.

HORACE W. LINDSAY.